Figure 1:
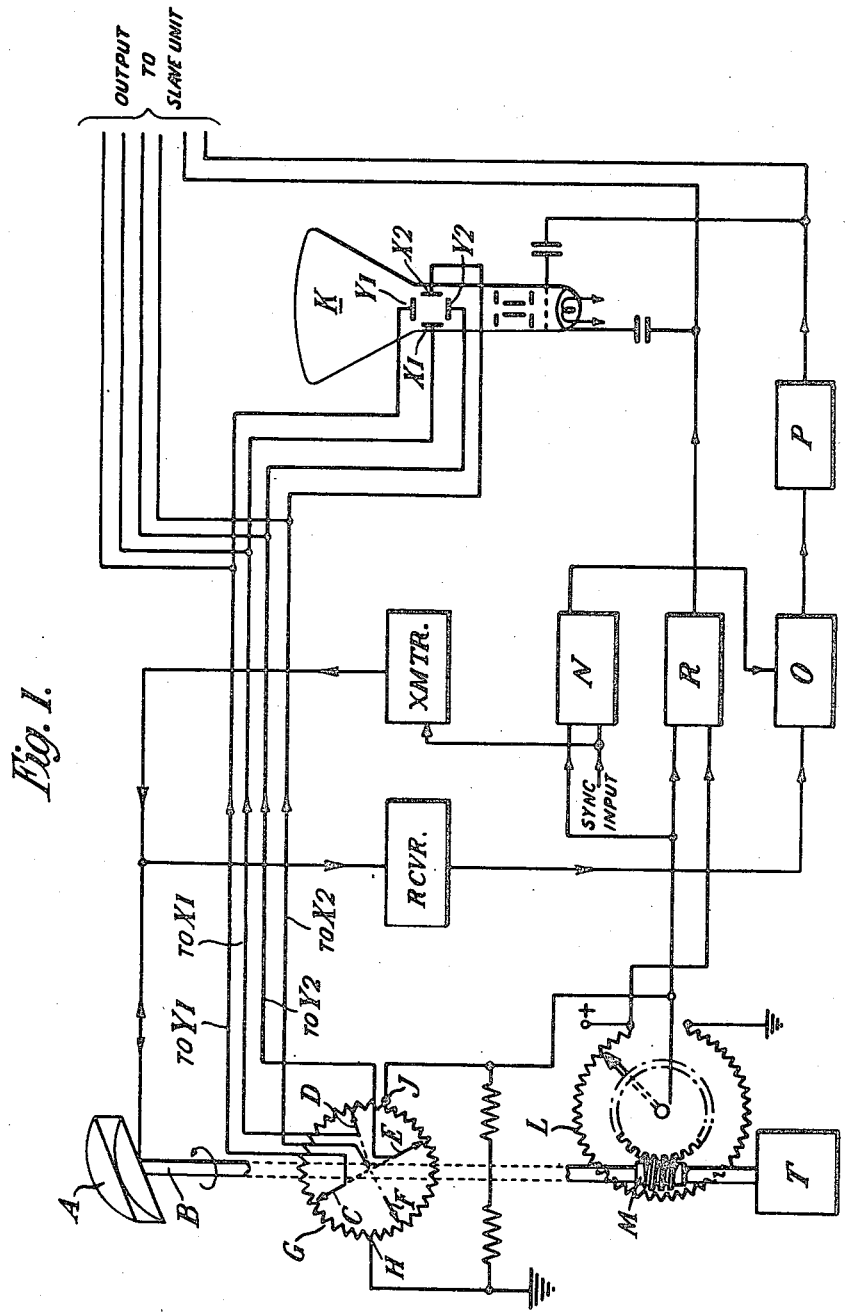

Aug. 7, 1951  C. A. LAWS  2,562,987
UTILITY RADAR SYSTEM
Filed July 30, 1947  2 Sheets-Sheet 2

3 IS A PHOTOCELL AND 2 DE-
SIGNATES STRIPS OF LIGHT RE-
FLECTING MATERIAL ON A BLACK
BACKGROUND 1,
    OR
3 IS A CONTACT BRUSH AND 2
DESIGNATES STRIPS OF INSULAT-
ING MATERIAL ON A CONDUCT-
ING BACKGROUND 1.

Inventor:
    Cecil A. Laws.
By
    Kenyon & Kenyon
        his Attorneys

Patented Aug. 7, 1951

2,562,987

UNITED STATES PATENT OFFICE 2,562,987

UTILITY RADAR SYSTEM

Cecil Alfred Laws, Boreham Wood, England, assignor to National Research Development Corporation, London, England, a corporation of Great Britain Application July 30, 1947, Serial No. 764,809
In Great Britain December 6, 1945

Section 1, Public Law 690, August 8, 1946
Patent expires December 6, 1965

13 Claims. (Cl. 343—5)

This invention is for improvements in and relating to object-locating and -detecting systems of the type in which a beam of electro-magnetic or accoustic radiation is caused to rotate or to oscillate to and fro in azimuth and "echo" signals reflected or reradiated from objects illuminated by the beam are reproduced on the luminescent screen of a cathode ray tube. Such systems, which are known generally as radar systems when the radiation is of radio-frequency, are of considerable value as navigational aids for aircraft or ships in addition to their use as simple detecting systems. The apparatus which has hitherto been developed for military purposes is complicated and requires for its successful operation the provision of highly trained personnel, but for normal peacetime use it is desirable that such apparatus should be as simple as possible, relatively inexpensive and should maintain its full efficiency for long periods without requiring the services of skilled mechanics.

The main object of the present invention is to provide an object-locating and -detecting system which is simple to operate and to maintain and in which displays of the kind shown as a plan position-indicator can be disposed at any selected position remote from the receiver without the necessity for complicated electronic circuits being associated with each display.

This is achieved according to the present invention by an object-locating and -detecting system in which a beam of electromagnetic or accoustic radiation is caused to rotate or to oscillate to and fro in azimuth and "echo" signals reflected or reradiated from objects illuminated by the beam are reproduced on the luminescent screen of a cathode ray tube, wherein means are provided for causing the electron beam of the cathode ray tube to trace a spiral path on the luminescent screen so as to cover the screen during a predetermined number of rotations in azimuth of the transmitted beam, the angular rotation of the electron beam and the rotation in azimuth of the transmitted beam being synchronous, and means are provided for suppressing the "echo" signals applied to the cathode ray tube for a time proportional to the instantaneous value of the radius vector of the spiral path.

In a preferred arrangement of the invention means are provided for applying to the cathode ray tube two deflecting voltages which are relatively phase-displaced by 90° and vary sinusoidally in synchronism with the rotation in azimuth of the transmitted beam so as to produce a circular trace on the cathode ray tube screen, means are provided for steadily varying the amplitude of the sinusoidal voltages during a predetermined number of rotations in azimuth so as to convert the circular trace into a spiral trace and means are also provided for suppressing the "echo" signals applied to the cathode ray tube for a time proportional to the variations in the amplitude of the sinusoidal voltages.

Figure 2:
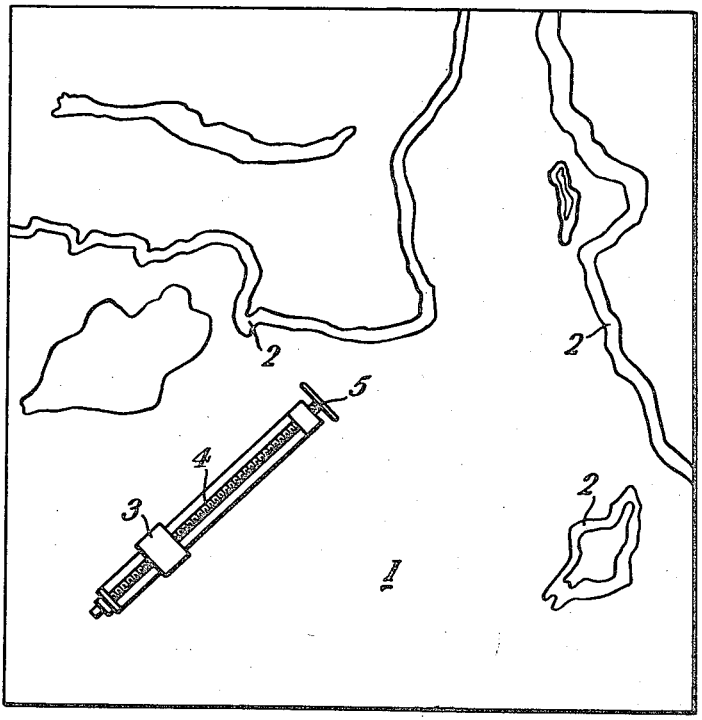

In order that the invention may be readily understood examples thereof will now be described with reference to the accompanying drawings, in which;

Figure 1 is a block schematic diagram of a radar system in accordance with the present invention, and Figure 2 shows diagrammatically a method of artificially producing on the screen of a cathode ray tube the radar picture which will be obtained when the present invention is in use.

Referring to Figure 1, an aerial system A, which may be employed both for transmission and reception of pulse-modulated radio-frequency signals, is directly coupled through a shaft B to means T, for rotating four brushes C, D, E, F around the surface of a potential divider G. The resistance winding on the potential divider G is tapped at points H and J which are exactly 180° apart and the resistance winding is so arranged that the output from the pairs of brushes C, E and D, F is sinusoidal when they are rotated in synchronism around the surface of the potential divider and when a potential is applied to the points H, J. The pairs of brushes C, E and D, F are connected directly to the X and Y deflection plates respectively of an electrostatically controlled cathode ray tube K, the plate sensitivities of the X and Y plates preferably being identical. It will be seen that when the brushes C, E and D, F are rotated around the potential divider G two sinusoidally varying voltages which are relatively phase-displaced by 90° will be applied to the X and Y plate of the cathode ray tube K and the electron beam will trace a circle on the luminescent screen of the tube, the diameter of the circle depending directly on the magnitude of the potential applied to the points H, J on the potential divider G. If the value of this potential is slowly increased from zero as the brushes rotate around the potential divider the electron beam will trace out a spiral path on the screen of the cathode ray tube, the pitch of the spiral being determined by the relative speed of rotation of the brushes C, E, D, F and the rate of change in the potential applied to the points H, J. In order to provide the desired variation in the potential appled to the points H, J a further potential divider L is coupled to the shaft B through a simple gear box M and the resistance winding of the potential divider L is connected in series with the source of potential applied to the points H, J, so that as the slider of the potential divider L is rotated the potential applied to the points H, J varies in synchronism with the rotation in azimuth of the aerial A. It is desirable to arrange for the maximum potential applied to the points H, J to be such that the largest radius vector of the spiral so obtained completely covers the surface of the cathode ray tube screen.

The variable potential derived from the potential divider L is also fed to a simple delay unit N the function of which is to produce a short gating pulse at a definite time after the synchronising pulse which controls the repetition frequency of the pulsed radio-frequency signals from transmitter XMTR, the time interval being a direct function of the applied potential. The synchronising circuit, which is not shown, is also connected to the delay unit N. Thus, for example, the time interval may be zero when the applied potential is zero and 30 microseconds when the applied potential is, say, 300 volts. A suitable circuit for the delay unit N is described in the Proceedings at the radiolocation convention, Journal of the Institution of Electrical Engineers (London), volume 93, No. 7, part IIIA, page 1191. The gating pulse derived from the delay unit N is fed to a video amplifier O which is normally suppressed but which permits the passage of amplified "echo" signals received through the receiver RCVR from aerial A on receipt of the gating pulse from the delay unit N and these signals are fed to the grid of the cathode ray tube K. It will be seen, therefore, that when the aerial A is rotated at a suitable speed a picture will be produced on the screen of the cathode ray tube representing in plan the area illuminated by the transmitted beam of pulses produced by the transmitter XMTR, the picture indicating in range and bearing the positions of objects which give rise to "echo" signals.

The variable potential derived from the potential divider L is, in addition, applied to the cathode of the cathode ray tube K through a range calibrator R which, in known manner, provides a source of calibration marks for measuring the range indicated on the screen. For a description of a suitable range calibrator R, see Proceedings at the radiolocation convention, Journal of the Institution of Electrical Engineers (London), volume 93, No. 2, part IIIA, page 395, et seq.

In a plan position-indicator as employed in known radar systems the representation in plan is produced by a rapid radial scan of the cathode ray tube screen and it will be appreciated that with the spiral trace according to the invention the peripheral speed of the electron spot is considerably smaller than the radial speed of the equivalent radian scan in the known system. It is possible, therefore, for the video signals to be lengthened considerably and if this is effected after the gating process no loss in range discrimination is incurred. If the video signals are lengthened too much, however, then the effective width of the transmitted beam is increased and bearing discrimination is thereby reduced but the video pulse length can be increased considerably before this effect assumes any importance. For this purpose a pulse lengthening unit P is connected between the video amplifier O and the grid of the cathode ray tube K. Thus, with a pulse repetition frequency of 10 kilocycles per second the time interval between pulses is approximately 100 microseconds and with an aerial rotation speed of 400 per minute the time interval represents ¼° of arc. If, therefore, the video pulses are lengthened after gating to 100 microseconds then the arcs painted on the screen of the cathode ray tube will be lengthened by ¼°. The consequent loss in bearing discrimination is in general quite acceptable but as the lengthening circuit requires some recovery time a more practical figure for the lengthening of the video pulses would be 50 microseconds which gives an increase in arc length of only ⅛°.

If desired, means may be provided for giving aural or visual warning of the presence of an object which gives rise to "echo" signals within a given predetermined range and for this purpose the potential at the slider of the potential divider L may be used to control a simple gating circuit which passes the lengthened video signals when they fall within the preset range, the gating circuit operating a relay for triggering the warning system.

Under certain conditions it may be advantageous to scan only a portion of the complete picture on the screen of the cathode ray tube, this being effected at a higher rate than that at which the entire picture is scanned. This can be effected by providing an alternative gear ratio for the gear box M connected between the potential dividers G and L and by appropriately adjusting the potential applied to the potential divider L. In this manner the scan can be limited to, say, the outer five centimeters of the screen of the cathode ray tube and the number of pictures per minute increased.

As will be seen from Figure 1, any number of "slave" display units may be connected in parallel to the cathode ray tube K without the addition of any equipment at the "master" display unit and there is no practical limitation to the distances between the various "slave" units and the "master" unit.

As an alternative to the arrangement shown in Figure 1, the $X_1$ and $Y_2$ plates of the cathode ray tube K may be connected together and to the tappings H, J, the variable potential being fed to two further tappings on the winding of the potential divider G which are spaced 90° away from the tappings H, J and only two brushes C, D spaced apart by 90° being used.

Figure 2 shows diagrammatically an arrangement by means of which radar pictures of areas to be scanned by the transmitted beam may be produced artificially on the screen of the cathode ray tube K, one of the main uses of such an arrangement being for teaching purposes. A map of the area to be covered is formed by fixing onto a metallic base-plate 1 strips of insulating material 2 which are cut to the shape of the coastlines in the area. A spring-loaded brush 3 is arranged to move backwards and forwards along an arm 4 which rotates about a point 5 assumed to be the site of the transmitter. The radial length of the brush 3 is determined by the pulse length, gate width and the scale of the map and can be made variable. The brush width is determined by the beam width and is arranged to increase as the brush moves along the arm 4 away from the point 5. The brush 3 and the base plate 1 are connected to a pulse generator which is so arranged that an output is obtained therefrom only when the brush is insulated from the base-plate, that is on land-masses, and the resulting output is fed to the video amplifier O of the display, the range and bearing potential dividers G and L, which are driven from the arm 4, being connected to the display in the manner already described. Alternatively the brush 3 may be replaced by a photoconductive cell and the base plate 1 and insulating material 2 replaced by a black-and-white print of the information which is to be produced on the screen of the cathode ray tube, the print being illuminated by means of an electric lamp.

It will be understood that the invention may be employed in systems for locating and detecting objects in which radiation of electromagnetic waves other than of radio-frequency, for example infra red rays, or radiation of sonic or supersonic frequencies are transmitted and the objects are located and detected by reception of echoes produced by the objects.

Numerous additional applications of the principles above-disclosed in the embodiments shown will occur to those skilled in the art and no attempt has been made to exhaust such possibilities. The scope of this invention is defined in the following claims.

What is claimed is:

1. In apparatus of the class described for producing a plan type of presentation, the combination of a cathode ray tube and a screen therefor, a spiral sweep circuit therefor for producing a spiral trace of the electron beam of the tube on the screen, an antenna rotatable in azimuth for receiving signals and connected to said cathode ray tube, a synchronizing connection between said antenna and sweep circuit to synchronize the angular rotation of the electron beam with the rotation in azimuth of the antenna, a control connected to said antenna and sweep circuit to cause the spiral trace to cover the screen during a predetermined number of rotations in azimuth of the antenna, and a delay suppression circuit for suppressing the signals applied to the cathode ray tube for a time proportional to the instantaneous value of the radius vector of the spiral path.

2. Apparatus according to claim 1 wherein the cathode ray tube includes deflecting plates and the sweep circuit provides two deflecting voltages which are relatively phase displaced by 90° and vary sinusoidally in synchronism with the rotation in azimuth of the antenna and which are applied to said deflecting plates.

3. Apparatus according to claim 2 wherein said sweep circuit includes means for steadily varying the amplitude of the sinusoidal voltages during the predetermined number of rotations in azimuth of the antenna.

4. Apparatus according to claim 3 wherein said means for steadily varying the amplitude of the sinusoidal voltages is also connected to said delay suppression circuit to suppress the signals applied to the cathode ray tube for a time proportional to the variations in the amplitude of the sinusoidal voltages.

5. Apparatus according to claim 1 wherein the cathode ray tube includes deflecting plates and the sweep circuit includes a sine-law potential divider having brushes connected to rotate in synchronism with the antenna and connected to said deflecting plates for producing two sinusoidal deflecting voltages relatively phase displaced by 90°.

6. Apparatus according to claim 5 wherein the sweep circuit includes a second potential divider having a slider connected to said antenna to rotate at a speed proportional to the speed of the antenna and connected to said sine-law potential divider to provide an energizing direct current potential which increases from zero to a selected maximum value during a predetermined number of rotations of the antenna.

7. Apparatus according to claim 6 wherein there is a synchronizing circuit for the apparatus adapted to produce synchronizing pulses and said delay suppression circuit is under control of said synchronizing circuit and connected to the slider of the second potential divider to produce a gating pulse at an interval proportional to the instantaneous value of the varying potential after the application thereto of each synchronizing pulse, and includes a normally suppressed video amplifier connected to said antenna and to the cathode ray tube to permit the passage thereto of signals from said antenna upon receipt of each gating pulse.

8. Apparatus according to claim 7 wherein there is a range calibrator connected to the slider of the second potential divider and to the cathode ray tube for providing calibation marks for indicating range on the screen of the cathode ray tube.

9. Apparatus according to claim 1 wherein there is a pulse lengthening circuit connected between the antenna and the cathode ray tube to increase the duration of the received signals to a value not greater than the pulse repetition interval of the apparatus.

10. In a trainer for producing a plan type of presentation of the area which would be illuminated by the antenna beam of a radar, the combination of a cathode ray tube and a screen therefor, a spiral sweep therefor for producing a spiral trace of the electron beam of the tube on the screen, a rotatable drive, a synchronizing connection between said drive and sweep circuit to synchronize the angular rotation of the electron beam with the rotation of the drive, a control connected to said drive and sweep circuit to cause the spiral trace to cover the screen during a predetermined number of rotations of the drive, a representation of the area which would be illuminated by the antenna beam wherein wave energy reflecting bodies have different characteristics from non-reflecting bodies, a pulse generator connected to said cathode ray tube, and a spiral scanner responsive to said different characteristics connected to said drive for scanning said representation and controlling said pulse generator connected to said cathode ray tube to produce on the screen thereof signals simulating those which would be returned to a radar whose antenna beam illuminates the area corresponding to said representation.

11. In apparatus of the class described for producing a plan type of presentation, the combination of a cathode ray tube and a screen therefor, a spiral sweep circuit therefor for producing a spiral trace of the electron beam of the tube on the screen, a source of pulses and a member connected thereto and rotatable in azimuth for producing signals at varying times as said member rotates, a connection to said cathode ray tube for said produced signals to produce indications on said screen thereof, a synchronizing connection between said member and said sweep circuit to synchronize the angular rotation of the electron beam with the rotation in azimuth of said member, and a control connected to said member and sweep circuit to cause the spiral trace to cover the screen during a predetermined number of rotations in azimuth of said member, whereby a plan position type of presentation is produced on said screen, the angular position of each indication being determined by the relative position in azimuth of said member at the time the corresponding signal is produced and its radial position being determined by the time the corresponding signal is produced relative to the start of the spiral trace.

12. Apparatus according to claim 11 including a representation of the area which would be illuminated by the antenna beam if said rotatable member were an antenna, said representation comprising a pictorial display in which the representations of wave energy reflecting bodies are of different light reflecting intensities from the representations of non-reflecting bodies and wherein the source of pulses includes a control element, said rotating member comprises an arm which rotates about one end thereof in synchronism with said sweep circuit and carries a photo-conductive cell which travels along the length of the arm during a predetermined number of rotations of the arm to effect a spiral scan of the pictorial display and the photo-conductive cell is connected to the control element of said source of pulses thereby to modulate the cathode ray tube in response to output signals from the photo-conductive cell.

13. Apparatus according to claim 11 including a representation of the area which would be illuminated by the antenna beam if said rotatable member were an antenna, said representation comprising a uni-planar map in which wave energy reflecting bodies are represented by insulating material mounted on an electrically-conductive baseboard representing non-reflecting bodies and wherein said source of pulses includes a control element, said rotating member comprises an arm which rotates about one end thereof in synchronism with said sweep circuit and carries a brush in contact with the map and which travels along the length of the arm during a predetermined number of rotations of the arm to effect a spiral scan, a source of potential is connected to the brush, and the baseboard is connected to the control element of said source of pulses thereby to modulate said cathode ray tube when the brush is insulated from the baseboard.

CECIL ALFRED LAWS.

REFERENCES CITED

The following references are of record in the file of this patent:

UNITED STATES PATENTS

| Number | Name | Date |
|---|---|---|
| 2,231,929 | Lyman | Feb. 18, 1941 |
| 2,409,448 | Rost | Oct. 15, 1946 |
| 2,422,975 | Nicholson | June 24, 1947 |
| 2,426,654 | White | Sept. 2, 1947 |
| 2,432,101 | Shepherd | Dec. 9, 1947 |
| 2,440,250 | Deloraine | Apr. 27, 1948 |